(No Model.) 2 Sheets—Sheet 1.

J. KRUESI.

JUNCTION BOX AND CONNECTION FOR ELECTRICAL CONDUCTORS.

No. 273,859. Patented Mar. 13, 1883.

WITNESSES:
E. C. Rowland
H. W. Seely

INVENTOR:
John Kruesi
By Rich'd N. Dyer
Atty.

(No Model.)

J. KRUESI.

JUNCTION BOX AND CONNECTION FOR ELECTRICAL CONDUCTORS.

No. 273,859. Patented Mar. 13, 1883.

WITNESSES:
E. C. Rowland
H. W. Seely

INVENTOR:
John Kruesi,
By Richd. N. Dyer
Atty.

UNITED STATES PATENT OFFICE.

JOHN KRUESI, OF BROOKLYN, NEW YORK.

JUNCTION BOX AND CONNECTION FOR ELECTRICAL CONDUCTORS.

SPECIFICATION forming part of Letters Patent No. 273,859, dated March 13, 1883.

Application filed August 5, 1882. (No model.)

*To all whom it may concern:*

Be it known that I, JOHN KRUESI, of Brooklyn, in the county of Kings and State of New York, have invented a certain new and useful Improvement in Junction Boxes and Connections for Electrical Conductors, of which the following is a specification.

In multiple-arc systems of electrical distribution, in which the conductors are laid in pairs within iron inclosing-tubes, it is desirable at the intersections of streets to connect together all the positive conductors, and likewise all the negative. The most convenient mode of doing this is to place in the center or at some other convenient point of the street intersection a junction-box, into which all the meeting conductors are run, and within which the like conductors are coupled together.

My invention relates to junction-boxes of this character, my object being to produce boxes, and internal connecting devices for the same, which shall be of simple and economical and at the same time highly-efficient construction.

Figure 1:
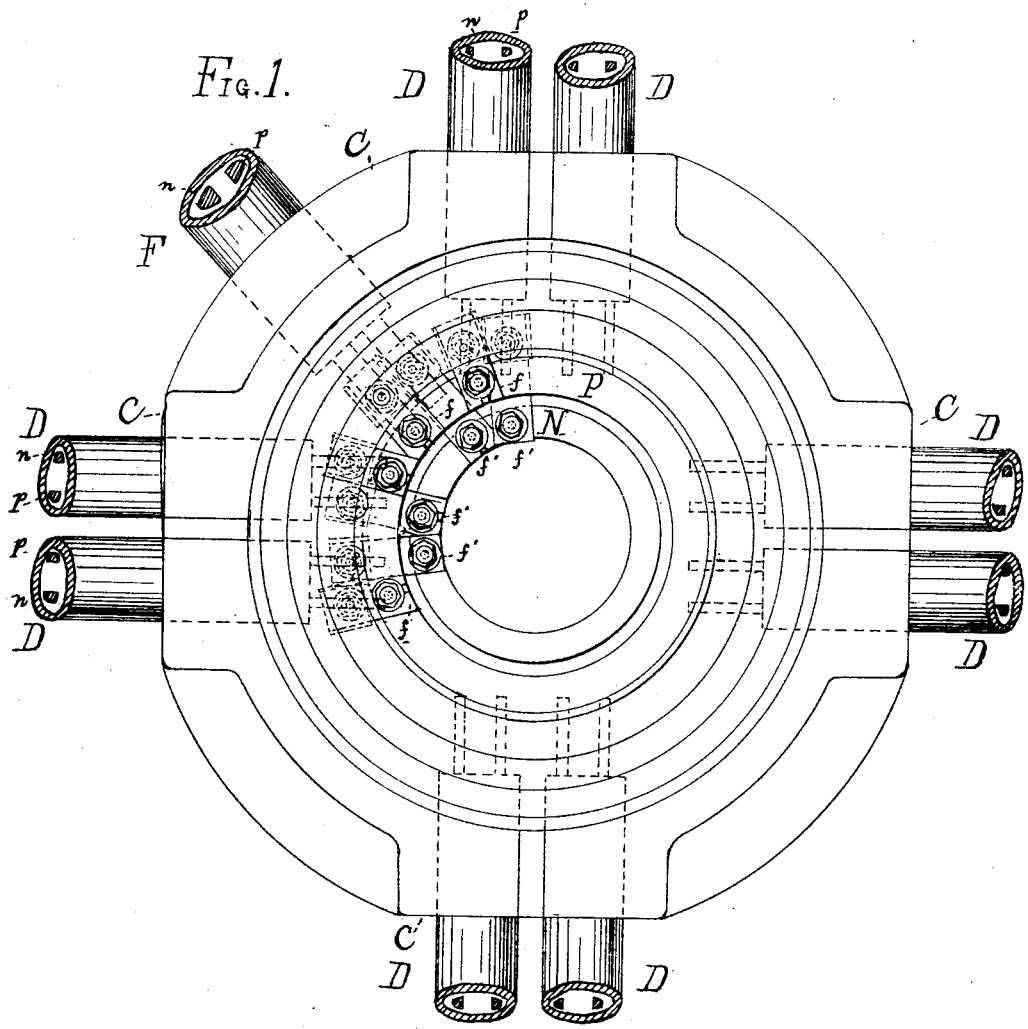
Figure 2:
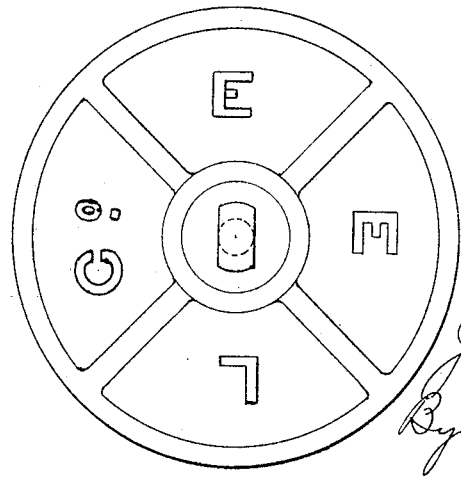
Figure 3:
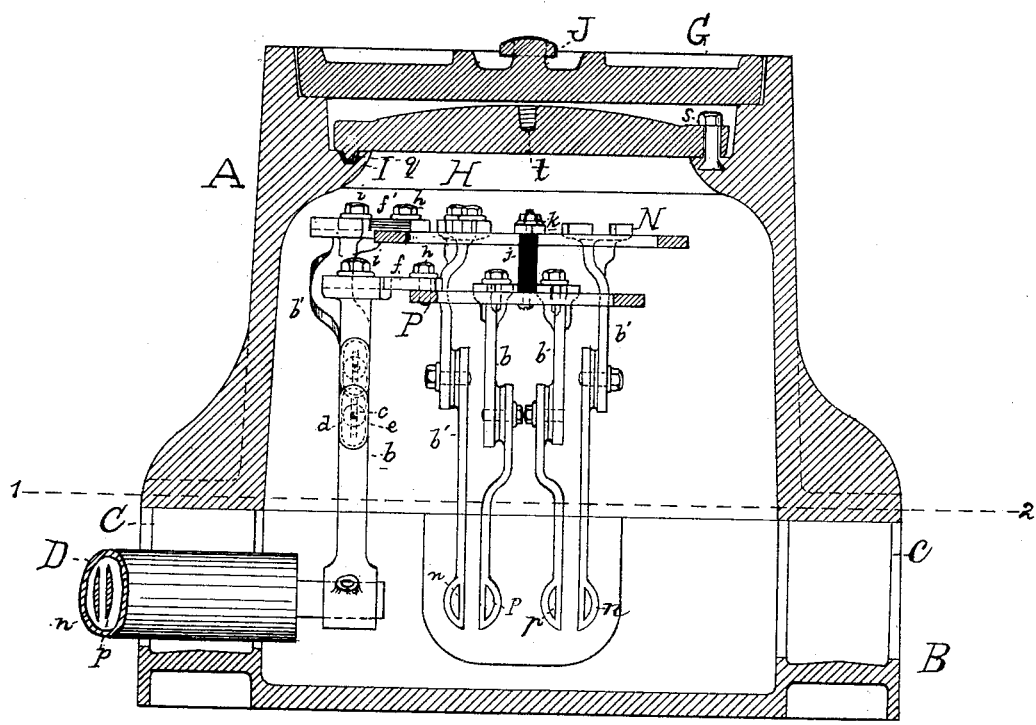
Figure 4:
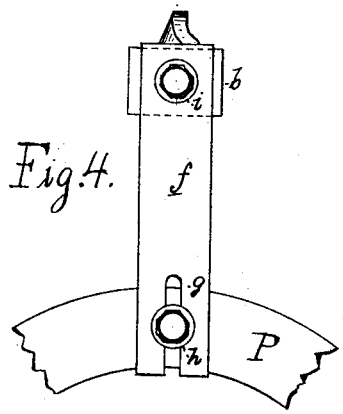
Figure 5:
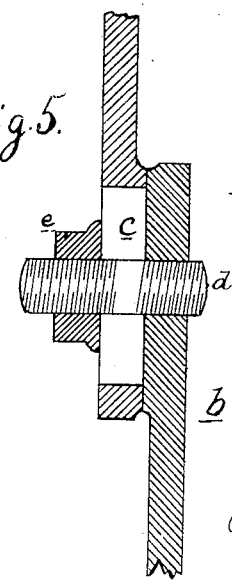
Figure 6:
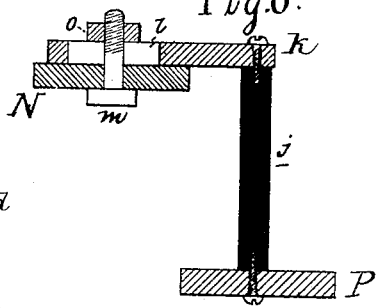

My invention is illustrated in the accompanying drawings, in which Figure 1 is a top view of the box with its cover removed and a portion of the internal connections shown; Fig. 2, a top view of the cover of said box; Fig. 3, a vertical section of the box, showing only a part of the connecting devices and these in elevation; and Figs. 4, 5, and 6, detail views of different portions of the internal connecting devices.

The box is made in two parts, A B— one above the other—as in Fig. 3, and secured together preferably by bolts. The lower portion, B, is provided with slots C C, which form apertures through which the tubes carrying the conductors enter the box, they being held therein by suitable collars or washers. A box of this kind would ordinarily have four of these apertures, each being adapted to receive two of the inclosing-tubes. The box shown, however, has five, four of which receive the ordinary main conductor tubes, D D, while the fifth receives tube F, which holds the conductors of a feeding-circuit. Each tube contains a positive conductor, $p$, and a negative conductor, $n$. At a place where one street enters another without crossing it the box would ordinarily have only three apertures. The box, instead of being placed at the center of the street intersection, might be near one of the corners or at any other convenient point. The lower portion of the box to a point above the tops of the tube-openings (about to the level of the line 1 2, Fig. 3) is filled with an insulating substance, which is poured in while in a soft or semi-liquid condition and allowed to cool and harden. This prevents the admission of moisture through the tube-openings. The conductors $p$ $n$ project from their inclosing-tubes within the box. Attached near the end of each conductor is a riser, $b$ or $b'$, (the risers $b$ being connected to conductors $p$ and risers $b'$ to conductors $n$,) which project up above the insulating material and nearly to the top of the box, in order to bring the connecting devices (which are attached to these risers) to a position where they may be easily reached for repairs or adjustment. The risers are made in two parts, one or both of which contain a longitudinal slot, $c$, through which and through the other part passes a bolt, $d$, secured by a nut, $e$, by which means the riser is made adjustable both vertically and horizontally. This device is shown in detail in Fig. 5, which is a sectional view thereof. An arrangement of this kind is necessary, because the tubes often enter the box at more or less of an angle, either vertical or horizontal, and to counteract this the riser is so arranged that its length is adjustable, and it may be adjusted to any desired angle at the point of junction between its two parts.

Two metal rings, P and N, are placed in the upper part of the box, one above the other, forming the pole-plates with which the connections are made. To the ring P all the risers $b$ are connected, and to the ring N all the risers $b'$, the latter being curved to avoid the lower ring. The connections of the risers $b$ to the ring P are made by means of strips of lead $f$, one of which runs from the top of each riser to the ring. One of these connecting-strips is shown in detail in Fig. 4, which is a top view of the device. The strip $f$ has a slot, $g$, which receives a bolt attached to the ring P, and having a nut, $h$, and the top of the riser has also a slot, in which the strip $f$ is placed and secured by a bolt and nut, $i$. By this means the strips $f$ are made removable and longitudinally adjustable, so that the circuit of any conductor may be broken at once, if desired, and the lead strips may be replaced when destroyed. The risers $b'$ are connected to the upper ring, N, by copper strips $f'$, which are constructed and arranged in the same manner as the lead strips $f$. The arrangement shown might be reversed, the lead strips being placed in the negative and the copper ones in the positive conductors; or both sets of connecting-strips may be of lead. The lead strips are used as safety-catches, they being of such size as to fuse or burn out, should an abnormal amount of current flow through the conductor. To support the ring P, should all the safety-catches burn out at once, said ring is connected with the upper ring by bars or blocks of insulating material, $j$—such as hard rubber—two or three of which are used in each box, one being shown in detail in Fig. 6. The insulating-piece is secured directly to the lower ring, P, by a screw; but its upper end is secured to a separate piece, $k$, having a slot, $l$, through which passes the bolt $m$ from the ring N, held by a nut, $o$. The position of the strip $j$ is thus made adjustable, so that in case the rings P and N cannot be placed in exactly the proper relative positions the supporting-connection can still be made between them. Instead of the circular rings shown, connecting-plates of a square, oblong, or other convenient shape may be used, and the boxes may also be of a square or oblong form. By making these insulating-bars and also the conducting-strips which connect the risers with the rings adjustable, the necessity for the nice and perfect fitting of the parts, which would otherwise be required, is avoided.

All the contacts of conducting parts which are not removable—such as the junctions of the risers with the main conductors—are soldered together. The removable and adjustable joints, however, except those of the lead strips, have the contact-surfaces gold-plated to produce a good and non-oxidizable contact.

The risers are preferably coated with Japan varnish to prevent loss of energy by leakage from one to the other, which might occur should moisture collect on the top of the insulating compound.

At the top of the box are two covers—an outer one, G, and an inner one, H. An internal flange, I, is formed near the top of the box, having a groove, $q$, which holds a circular rib on the bottom of the cover. Bolts $s$ are cast into the flange I at intervals to secure said cover. Red lead is placed under the edge of the cover for the purpose of excluding moisture. Said cover has a screw-threaded hole, $t$, partly through its center, which is filled with tallow to prevent rusting. The outer cover, G, rests on a shoulder inside the box, and at its center has a knob, J, by which it may be lifted by a suitable tool. The top of the cover is corrugated by ribs and raised letters or otherwise, as in Fig. 2, so as to furnish a secure foothold for horses, such cover being level with the street. To remove the inner cover, the nuts of bolts $s$ are removed and a screw-threaded rod is inserted in the hole $t$, (the tallow having been dug out from said hole,) and the cover lifted thereby, a convenient plan when considerable force is required being to place a cross-strap across the top of the box, through which the screw-threaded rod passes, a nut being placed above said strap, so that by screwing said nut down the rod and cover are raised.

What I claim is—

1. In an electrical distribution system, the junction-box placed at the intersection of two streets and receiving all the conductors which meet at such intersection, in combination with connections between all the conductors of the same polarity and risers within said box for bringing the connections of said conductors to the surface, substantially as set forth.

2. The combination, with the junction-box and the series of conductors entering the same, of the two pole-plates located near the top of the box, and the risers connected at their lower ends with the conductors, and at their upper ends with such pole-plates, substantially as set forth.

3. The combination, with the junction-box and the series of conductors entering the same, of the two pole-plates located near the top of the box, connections between the conductors and pole-plates, and safety-catches in the several circuits, substantially as set forth.

4. The combination, with the junction-box, the conductors entering the box, and the two pole-plates near the top of the box, of the risers connecting said conductors with said pole-plates, such risers being adjustable both vertically and horizontally, substantially as set forth.

5. The combination, with the junction-box, the series of conductors, the risers, and the two pole-plates near the top of the box, of the removable and longitudinally-adjustable connecting-strips connecting the risers with said pole-plates, substantially as set forth.

6. The combination, with the positive and negative rings P and N and the circuit-connections with said rings, of the insulating-supports mechanically connecting said rings, substantially as set forth.

7. The combination, with the rings P and N, of the insulating-supports $j$, mechanically connecting said rings, and an adjustable connection between the supports and one of said rings, substantially as set forth.

8. The combination, with the junction-box, having tube-openings in its lower part, tubes entering said openings, and electric conductors projecting from said tubes into the box, of pole-plates near the top of the box, risers connecting the conductors with the pole-plates, and an insulating substance filling the lower part of said box and covering the connections between the risers and the conductors, substantially as set forth.

9. The combination, with the junction-box, having tube-openings in its lower part, tubes entering said openings, and electric conductors projecting from said tubes into the box, of pole-plates near the top of the box, risers connecting the conductors with the pole-plates, and an insulating substance filling the lower part of said box and covering the connections between the risers and conductors, said risers being protected by a separate insulating-covering above the surface of the compound, substantially as set forth.

This specification signed and witnessed this 28th day of July, 1882.

JOHN KRUESI.

Witnesses:
WM. H. MEADOWCROFT,
H. W. SEELY.